United States Patent
Chen

(10) Patent No.: US 7,238,337 B2
(45) Date of Patent: Jul. 3, 2007

(54) METHOD OF MAKING ALL-SILICA ZEOLITE WITH IFR STRUCTURE

(75) Inventor: Cong-Yan Chen, Kensington, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 11/264,197

(22) Filed: Oct. 31, 2005

(65) Prior Publication Data

US 2007/0098630 A1    May 3, 2007

(51) Int. Cl.
*C01B 37/02* (2006.01)

(52) U.S. Cl. .................. 423/706; 423/708; 423/335

(58) Field of Classification Search ............... 423/706, 423/708, 335
See application file for complete search history.

(56) References Cited

U.S. PATENT DOCUMENTS

| | | | |
|---|---|---|---|
| 4,910,006 A | | 3/1990 | Zones et al. |
| 4,963,337 A | | 10/1990 | Zones |
| 5,437,855 A | * | 8/1995 | Valyocsik .................. 423/706 |
| 5,441,721 A | * | 8/1995 | Valyocsik .................. 423/706 |
| 5,653,956 A | * | 8/1997 | Zones ........................ 423/706 |

FOREIGN PATENT DOCUMENTS

WO    WO 98/29332 A    *    7/1998

OTHER PUBLICATIONS

Barrett et al., "Synthesis and Structure of As-Prepared ITQ-4, A Large Pore Pure Silica Zeolite; The Role and Location of Fluoride Anions and Organic Cations," J. Phys. Chem. B, 1998 102, 4147-4155.*

P.A. Barret, M.A. Camblor, A. Corma, R.H. Jones, and L.A. Villaescusa, Structure of ITQ-4, a New Pure Silica Polymorph Containing Large Pores and a Large Void Volume, Chem. Mater, 1997, 1713-1715.

Cong-Yan Chen, Larry W. Finger, Ronald C. Medrud, Charles L. Kibby, Peter A. Crozier, Ignatius Y. Chan, Thomas V. Harris, Larry W. Beck, and Stacey I. Zones, Synthesis, Structure, and Physicochemical and Catalytic Characterization of the Novel High-Silica Large-Pore Zeolite SSZ-42, Chem. Eur J. 1998, 4, No. 7, 1312-1323.

C.Y. Chen, L.W. Finger, R.C. Medrud, P.A. Crozier, I.Y. Chan, T.V. Harris and S.I. Zones, SSZ-42: the first high-silica large pore zeolite with an undulating, one-dimensional channel system, Chem. Commun., 1997, 1775-1776.

Christopher W. Jones, Son-Jong Hwang, Tatsuy Okubo, and Mark E. Davis, Synthesis of Hydrophobic Molecular Sieves by Hydrothermal Treatment with Acetic Acid, Chem. Mater, 2001, 13, 1041-1050, Published on Web Jan. 23, 2001.

Raul F. Lobo, Ming Pan, Ingnatius Chan, Ronald C. Medrud, Stacey I. Zones, Peter A. Crozier, and Mark E. Davis, Physicochemical Characterization of Zeolites SSZ-26 and SSZ-33, J. Phys. Chem, 1994, 98, 12040-12052.

Miguel A. Camblor, Avelino Corma and Luis A. Villaesusa, ITQ-4: a new large pore microporous polymorph of silica, Chem. Commun, 1997, 749-750.

C.Y. Chen, S.I. Zones, L.T. Yuen, T.V. Harris and S.A. Elomari, Factors Influencing The Synthesis Of Novel Large Pore Zeolite SSZ-42 And Its Subsequent Characterization, 12th International Zeolite Conference, 1999, 1945-1951, Richmond, CA.

P.A. Barrett, E.T. Boix, M.A. Camblor, A. Corma, M.J. Diaz-Cabanas, S. Valencia and L.A. Villaesusa, Synthesis of Defect-Free Pure Silica Polymorphs Of Low Framework Density in Aqueous Fluoride Media, 12th International Zeolite Conference, 1999, 1495-1502.

Paul Wagner, Yumi Nakagawa, Greg S. Lee, Mark E. Davis, Saleh Elomari, Ronald C. Medrud, and S.I. Zones, Guest/Host Relationship in the Synthesis of the Novel Cage-Based Zeolites SSZ-35, SSZ-36, and SSZ-39, American Chemical Society, 2000, 263-273.

* cited by examiner

*Primary Examiner*—David Sample
(74) *Attorney, Agent, or Firm*—Richard J. Sheridan

(57) ABSTRACT

An all-silica zeolite having the IFR framework topology can be directly synthesized by preparing a reaction mixture comprising (1) an active source of silicon oxide, (2) a structure directing agent comprising a N-benzyl-1,4-diazabicyclo[2.2.2] octane cation, (3) an active source of hydroxide and (4) water and maintaining the reaction mixture under conditions sufficient to form crystals of the zeolite.

3 Claims, No Drawings

METHOD OF MAKING ALL-SILICA ZEOLITE WITH IFR STRUCTURE

BACKGROUND OF THE INVENTION

1. Field of the Invention

The present invention relates to a method for preparing all-silica crystalline zeolites having the IFR structure ("IFR zeolite").

2. State of the Art

Zeolites are an important class of microporous, crystalline solids which are used industrially in heterogeneous catalysis, adsorption, separation and ion-exchange. The properties of zeolites for these applications are strongly affected by the structural features such as the framework composition and topology. Benefiting from the hydrophobic properties of their electroneutral framework, pure-silica zeolites provide tremendous opportunities of separating nonpolar from polar molecules. As discussed below, it is often a challenge to synthesize such pure-silica zeolites. Therefore, it is desirable to find an economic and efficient way to reach this goal.

The direct synthesis is the primary route of the synthesis of zeolites. The major variables that have a predominant influence on the zeolite structure crystallized include the composition of synthesis mixture, temperature and time. Depending on the nature of the zeolites involved and the chemistry of their formation, some zeolite structures can be synthesized in a broad spectrum of framework compositions, as exemplified by ZSM-5 containing no heteroatoms (Si-ZSM-5, i.e., pure-silica ZSM-5), as well as ZSM-5 containing heteroatoms in its crystal framework (for example boron (B-ZSM-5, i.e., borosilicate ZSM-5), gallium (Ga-ZSM-5, i.e., gallosilicate ZSM-5) or aluminum (Al-ZSM-5, i.e., aluminosilicate ZSM-5)). By contrast, the synthesis of some other structures succeeds only if certain heteroatom X (X=B, Ga or Al, for example) is present in the synthesis mixture and, in turn, incorporated into the framework. In many cases, certain zeolite structures can be synthesized only with certain specific heteroatoms within a limited range of Si/X ratio or in the presence of certain specific structure directing agents (SDAs). These complicated relationships between zeolite structures, framework compositions and SDAs have been discussed in many publications and patents (see S. I. Zones et al. *J. Am. Chem. Soc.* 2000, 122, 263–273; U.S. Pat. No. 4,963,337, issued Oct. 16, 1990 to Zones et al.; U.S. Pat. No. 4,910,006, issued Mar. 20, 1990 to Zones et al.; and R. F. Lobo, M. Pan, I. Y. Chan, R. C. Medrud, S. I. Zones, P. A. Crozier and M. E. Davis, *J. Phys. Chem.* 1994, 98, 12040–12052.)

In addition to the direct synthesis method, post-synthetic treatments often provide an alternative route to modify the zeolites to acquire desirable framework compositions. The post-synthetic treatment techniques all operate on the same principle: the desirable atoms such as Al and Si are inserted into lattice sites previously occupied by other T-atoms such as B. For example, Jones et al. developed a method of making pure-silica zeolites post-synthetically via treatment of borosilicate zeolites with, for example, acetic acid to expel boron from zeolites and subsequently heal the defects created by deboronation with silicon dissolved from other parts of the crystal (see C. W. Jones, S. J. Hwang, T. Okubo, M. E. Davis *Chem. Mater.* 2001, 13, 1041–1050). Although some pure-silica zeolites can be prepared via such post-synthetic techniques, it is always desirable to have a more economic and efficient way to reach the goal via direct hydrothermal synthesis.

There are two hydrothermal routes for the synthesis of pure-silica zeolites: (1) using OH anion as a mineralizer at high pH, and (2) using F$^-$ anion as a mineralizer at near neutral pH. Synthesis of many pure-silica zeolites has succeeded so far only using the fluoride method. The drawbacks of the fluoride route are that fluoride ions (from HF or NH$_4$F, for example) are involved in the synthesis and the crystallization usually takes a longer time than via the OH$^-$ route.

Zeolite SSZ-42, a known zeolite, is characterized by an undulating, one-dimensional 12-membered ring channel system (see C. Y. Chen, L. W. Finger, R. C. Medrud, P. A. Crozier, I. Y. Chan, T. V. Harris, S. I. Zones, J. Chem. Soc., Chem. Comm., 1997, 1775–1776; C. Y. Chen, L. W. Finger, R. C. Medrud, C. L. Kibby, P. A. Crozier, I. Y. Chan, T. V. Harris, L. W. Beck, S. I. Zones, *Chemistry—A European. J.* 1998, 4, 1312–1323; P. A. Barrett, M. A. Camblor, A. Corma, R. H. Jones, L. A. Villaescusa, *Chem. Mater.* 1997, 9, 1713–1715; and P. A. Barrett, M. A. Camblor, A. Corma, R. H. Jones, L. A. Villaescusa, *J. Phys. Chem. B* 1997, 102, 4147–4155.). According to the International Zeolite Association (IZA), the zeolites designated SSZ-42, MCM-58 and ITQ-4 have the same framework topology which the IZA has assigned the code "IFR" (see Ch. Baerlocher, W. M. Meier and D. H. Olson and, *Atlas of Zeolite Framework Types* 2001, Elsevier, p. 302).

Zeolites having the IFR framework topology can be synthesized in both borosilicate (B-IFR) and aluminosilicate (Al-IFR) form by using a variety of benzyl derivatives such as N-benzyl-1,4-diazabicyclo [2.2.2]octane, N-benzylquinuclidinium, N-benzylquinuclidinol or benzyltropanium cations as structure directing agents ("SDA"s) (see C. Y. Chen, L. W. Finger, R. C. Medrud, P. A. Crozier, I. Y. Chan, T. V. Harris, S. I. Zones, J. Chem. Soc., Chem. Comm., 1997, 1775–1776; COY. Chen, L. W. Finger, R. C. Medrud, C. L. Kibby, P. A. Crozier, I. Y. Chan, T. V. Harris, L. W. Beck, S. I. Zones *Chemistry—A European. J.* 1998, 4, 1312–1323; U.S. Pat. No. 5,653,956, issued Aug. 5, 1997 to Zones et al.; U.S. Pat. No. 5,441,721, issued Aug. 15, 1995 to Valyocsik; U.S. Pat. No. 5,437,855, issued Aug. 1, 1995 to Valyocsik; and C. Y. Chen, S. I. Zones, L. T. Yuen, T. V. Harris and S. A. Elomari, *Proc. 12th Int. Zeolite Conf.* 1998, 1945–1952.).

U.S. Pat. No. 5,653,956, issued Aug. 5, 1997 to Zones, discloses zeolite SSZ-42 (a zeolite having the IFR framework topology), methods of preparing it and its use in, e.g., catalysts for hydrocarbon conversion reactions. The SSZ-42 is prepared using a N-benzyl-1,4-diazabicyclo[2.2.2]octane cation or N-benzyl-1-azabicyclo[2.2.2]octane cation.

U.S. Pat. No. 5,653,956 does not, however, disclose all-silica SSZ-42 or the method for its preparation. For example, the SSZ-42 zeolite is said to have a mole ratio of an oxide selected from silicon oxide, germanium oxide and mixtures thereof to an oxide selected from aluminum oxide, gallium oxide, iron oxide, titanium oxide, boron oxide and mixtures thereof greater than 10 (see col. 2, 1. 54–61). Likewise, as-synthesized SSZ-42 is described as having a YO$_2$/W$_2$O$_3$ mole ratio of greater than or equal to 15, where Y is selected from the group consisting of silicon, germanium and mixtures thereof and W is selected from boron, aluminum, gallium, iron, titanium and mixtures thereof wherein at least 50% of W is boron (see col. 3, 1, 1–15). Thus, it appears that at least one oxide other than silicon oxide is present in the as-synthesized SSZ-42. This is confirmed in Examples 4 and 16 (the examples in which SSZ-42 is synthesized directly) where the product contains silicon along with boron or a mixture of boron and aluminum.

It is further disclosed in U.S. Pat. No. 5,653,956 that some or all of the boron in SSZ-42 may be replaced with at least one other element (see col. 8, 1.11–21 and Examples 14–16). However, there is no suggestion as to how an all-silica SSZ-42 can be made, and, in any case, the boron replacement is a post-synthesis step and not part of the direct synthesis of SSZ-42.

U.S. Pat. No. 5,437,855, issued Aug. 1, 1995 to Valyocsik, discloses zeolite MCM-58 (which, according to the IZA has the IFR framework topology), a method for its preparation and its use in the catalytic conversion of organic compounds. It is disclosed that the MCM-58 is prepared using a benzylquinuclidinium cation SDA. The MCM-58 has a composition containing an oxide of a tetravalent element (such as silicon, tin and/or germanium) and an oxide of a trivalent element (such as aluminum, boron, iron, indium and/or gallium). See col. 2, 1. 38–60, col. 4, 1. 40–55 and Examples 1–11. U.S. Pat. No. 5,437,855 does not, however, disclose all-silica MCM-58 (or any other all-silica zeolite having the IFR framework topology) or a method of making all-silica MCM-58.

U.S. Pat. No. 5,441,721, issued Aug. 15, 1995 to Valyocsik, also discloses zeolite MCM-58 (which, according to the IZA has the IFR framework topology), a method for its preparation and its use in the catalytic conversion of organic compounds. In this case, however, it is disclosed that the MCM-58 is prepared using a benzyltropanium cation SDA.

Like U.S. Pat. No. 5,437,855, the MCM-58 of U.S. Pat. No. 5,441,721 has a composition containing an oxide of a tetravalent element (such as silicon, tin and/or germanium) and an oxide of a trivalent element (such as aluminum, boron, iron, indium and/or gallium). See col. 2, 1. 33–56, col. 4, 1. 34–55 and Examples 1–6. U.S. Pat. No. 5,441,721 does not, however, disclose all-silica MCM-58 (or any other all-silica zeolite having the IFR framework topology) or a method of making all-silica MCM-58.

ITQ-4, which is a pure-silica zeolite having the IFR framework topology (see P. A. Barrett, M. A. Camblor, A. Corma, R. H. Jones, L. A. Villaescusa, *Chem. Mater.* 1997, 9, 1713–1715; P. A. Barrett, M. A. Camblor, A. Corma, R. H. Jones, L. A. Villaescusa, *J. Phys. Chem. B* 1997, 102, 4147–4155; M. A. Camblor, A. Corma, L. A. Villaescusa, *J. Chem. Soc., Chem. Commun.* 1997, 749–750; and P. A. Barrett, E. T. Boix, M. A. Camblor, A. Corma, M. J. Diaz-Cabañas, S. Valencia, L. A. Villaescusa, *Proc. 12th Intern. Zeolite Conf.* 1998, 1495–1502 and WO9829332, published Jul. 9, 1998.) is one of the examples among pure-silica zeolites synthesized by Camblor et al. via the fluoride route. Camblor et al. found that fluoride ions reside within the small $[4^35^26]$ cage located around the periphery of the central pore space of ITQ-4, showing some "templating" role for the formation of this structure (see P. A. Barrett, M. A. Camblor, A. Corma, R. H. Jones, L. A. Villaescusa, *J. Phys. Chem. B* 1997, 102, 4147–4155.). Camblor et al. pointed out that "the key parameter for the synthesis of ITQ-4 is the presence of F$^-$ anions, with a wide tolerance existing toward changes in pH." (see P. A. Barrett, M. A. Camblor, A. Corma, R. H. Jones, L. A. Villaescusa, *Chem. Mater.* 1997, 9, 1713–1715.).

The present invention provides, in contrast to the synthesis method of Camblor et al., a new method for the direct synthesis of all-silica zeolites having the IFR framework topology via the OH$^-$ route without using F$^-$ anions. These results are important since the synthesis medium consists only of a silicon source, SDA solution and, an active source of hydroxide (such as alkali metal hydroxide, alkaline earth metal hydroxide, ammonium hydroxide and/or the SDA in its hydroxide form). This result is also important because, aside from corrosion issues of the Camblor et al. F$^-$ synthesis, the method provides about double the yield of product per mole of silica compared to the F$^-$ method.

SUMMARY OF THE INVENTION

In accordance with the present invention there is provided a method for directly synthesizing an all-silica zeolite having the IFR framework topology comprising:

(a) preparing a reaction mixture comprising (1) an active source of silicon oxide, (2) a structure directing agent comprising a N-benzyl-1,4-diazabicyclo[2.2.2] octane cation, (3) an active source of hydroxide, and (4) water; and (b) maintaining the reaction mixture under conditions sufficient to form crystals of the all silica IFR zeolite.

Further provided in accordance with the present invention is an all-silica zeolite having the IFR framework topology and having a composition, as synthesized and in the anhydrous state, in terms of mole ratios as follows:

| | |
|---|---|
| OH$^-$/SiO$_2$ | about 0.05 to about 0.50 |
| Q/SiO$_2$ | about 0.10 to about 1.0 |
| M$_{2/n}$/SiO$_2$ | 0 to about 0.50 |
| H$_2$O/SiO$_2$ | about 3 to about 100 |
| Q/Q + M$_{2/n}$ | about 0.50 to about 0.95 | wherein Q is a N-benzyl-1,4-diazabicyclo[2.2.2] octane cation M is an alkali metal cation, alkaline earth metal cation or ammonium cation, and n is the valence of M.

The all-silica IFR zeolite made by the method of the present invention is useful in the separation and/or transformation of organic compounds, especially where a hydrophobic zeolite is desirable.

DETAILED DESCRIPTION OF THE INVENTION

Zeolites having the IFR framework topology are those which, after calcination, have a framework topology whose X-ray powder diffraction pattern includes the characteristic lines shown in Table I below:

TABLE I

| CALCINED IFR ZEOLITE | | |
|---|---|---|
| 2 Theta[a] | d/n | Relative Intensity[b] |
| 8.22 | 10.75 | VS |
| 9.76 | 9.06 | W |
| 16.42 | 5.394 | W |
| 19.22 | 4.615 | W |
| 20.48 | 4.333 | M |
| 20.84 | 4.259 | M |
| 21.48 | 4.134 | W |
| 21.72 | 4.088 | W–M |
| 23.68 | 3.754 | W |
| 24.06 | 3.696 | W |
| 24.94 | 3.568 | W |
| 25.40 | 3.504 | W |
| 26.60 | 3.348 | M |
| 29.56 | 3.019 | W |

[a] +/−0.10
[b] The X-ray pattern is based on a relative intensity scale in which the strongest line in the X-ray pattern is assigned a value of 100: W (weak) is less than 20; M (medium) is between 20 and 40; S (strong) is between 40 and 60; and VS (very strong) is greater than 60.

The variation in the scattering angle (two theta) measurements, due to instrument error and to differences between individual samples, is estimated at +/−0.10 degrees.

The all-silica IFR zeolites of this invention can be directly synthesized from an aqueous solution comprising an active source(s) of silicon oxide, the SDA, and, an active source of hydroxide (such as an alkali metal hydroxide, alkaline earth metal hydroxide, ammonium hydroxide and/or the SDA in its hydroxide form). The term "directly synthesized" as used herein means that the all-silica IFR zeolite is formed from the reaction mixture described below, as opposed to forming a zeolite containing silicon oxide and another oxide (e.g., aluminum oxide or boron oxide) and then subjecting the thus-formed zeolite to a post-synthesis treatment to create an all-silica IFR zeolite. The reaction mixture should have a composition, in terms of mole ratios, within the ranges shown in Table A.

TABLE A

IFR ZEOLITE REACTION MIXTURE

| | |
|---|---|
| $OH^-/SiO_2$ | 0.05 to 0.50 (e.g., 0.15 to 0.30) |
| $Q/SiO_2$ | 0.10 to 1.0 (e.g., 0.10 to 0.25) |
| $M_{2/n}/SiO_2$ | 0 to 0.50 (e.g., 0.03 to 0.10) |
| $H_2O/SiO_2$ | 3 to 100 (e.g., 20 to 50) |
| $Q/Q + M_{2/n}$ | 0.50 to 0.95 (e.g., 0.66 to 0.90) | wherein Q, M and n are as defined above. The reaction mixture does not contain fluoride ions, i.e., the all-silica IFR zeolite is directly synthesized in the absence of fluoride.

In practice, all-silica IFR zeolites are directly synthesized by a process comprising:
(a) preparing an aqueous solution containing an active source of silicon oxide, a N-benzyl-1,4-diazabicyclo[2.2.2] octane cation having an anionic counterion which is not detrimental to the formation of the IFR zeolite, and an active source of hydroxide; and
(b) maintaining the aqueous solution under conditions sufficient to form crystals of IFR zeolite.

The N-benzyl-1,4-diazabicyclo[2.2.2] octane cation SDA has the following general formula:

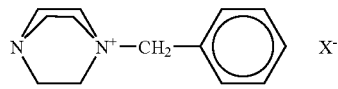

The anion ($X^-$) associated with the cation may be any anion which is not detrimental to the formation of the zeolite. Representative anions include halide, e.g., chloride, bromide and iodide, hydroxide, acetate, sulfate, tetrafluoroborate, carboxylate, and the like. Hydroxide is the most preferred anion.

Typical sources of silicon oxide include silicates, silica hydrogel, silicic acid, fumed silica, colloidal silica, tetraalkyl orthosilicates, and silica hydroxides.

The source of hydroxide may be an alkali metal hydroxide, such as the hydroxide of sodium, potassium, lithium, or cesium; an alkaline earth metal hydroxide; ammonium hydroxide. However, this component can be omitted so long as the equivalent basicity is maintained. The SDA may be used to provide hydroxide ion. Thus, it may be beneficial to ion exchange, for example, a hydroxide anion for a halide ion in the SDA, thereby reducing or eliminating the alkali metal hydroxide, alkaline earth metal hydroxide or ammonium hydroxide quantity required, i.e., the source of hydroxide may be the SDA alone or a combination of the SDA and an alkali metal hydroxide, alkaline earth metal hydroxide and/or ammonium hydroxide. The alkali metal cation, alkaline earth metal cation or ammonium cation may be part of the as-synthesized crystalline oxide material, in order to balance valence electron charges therein.

The reaction mixture is maintained at an elevated temperature until the crystals of the zeolite are formed. This hydrothermal crystallization is usually conducted under autogenous pressure, at a temperature between 100° C. (212° F.) and 200° C. (392° F.), preferably between 135° C. (275° F.) and 180° C. (356° F.). The crystallization period is typically greater than 1 day and preferably from about 3 days to about 15 days. The zeolite can be prepared with or without mild stirring or agitation.

During the hydrothermal crystallization step, the all-silica IFR zeolite crystals can be allowed to nucleate spontaneously from the reaction mixture. However, the use of IFR zeolite crystals as seed material can be advantageous in decreasing the time necessary for complete crystallization to occur. In addition, seeding can lead to an increased purity of the product obtained by promoting the nucleation and/or formation of IFR zeolite over any undesired phases. When used as seeds, IFR zeolite crystals are added in an amount sufficient to direct and/or accelerate crystallization, i.e., typically between about 0.1 and about 10% of the weight of silica used in the reaction mixture.

Once the zeolite crystals have formed, they are recovered. The solid product can be separated from the reaction mixture by standard mechanical separation techniques such as filtration. The crystals can be water-washed and then dried, e.g., at 90° C. (194° F.) to 150° C. (302° F.) for from 8 to 24 hours, to obtain the as-synthesized IFR zeolite crystals. The drying step can be performed at atmospheric pressure or under vacuum.

A primary advantage of the present invention is that all-silica IFR zeolites can be made directly, i.e., there is no need to first prepare an IFR zeolite containing silicon oxide and an oxide of another element (e.g., boron oxide) in its framework and then remove the other element (e.g., boron) from the zeolite's framework.

The present invention also provides an all-silica zeolite having the IFR framework topology in the as-synthesized state (i.e., prior to removal of the SDA from the zeolite).

EXAMPLES

The following examples demonstrate but do not limit the present invention.

Examples 1–3

Synthesis of Si-SSZ-42 Using Cab-O-Sil M-5 Fumed Silica as Silicon Source

All-silica SSZ-42 (i.e., an all-silica zeolite having the IFR framework topology) is synthesized under the following conditions:
(1) with varying amount of water but otherwise identical gel composition, (2) without NH$_4$OH, alkali metal hydroxide (e.g., KOH, etc.) or alkaline earth metal hydroxide,
(3) without fluoride anions,
(4) under static conditions,
(5) at 150° C.,
(6) with two different synthesis times: 15 and 30 days.

The gel compositions, i.e., reaction mixtures, and conditions are given in the table below:

| Example No. | Gel Composition (Mole Ratios) | Static/150° C. | |
|---|---|---|---|
| 1 | 0.15 Q$_2$O:SiO$_2$:43 H$_2$O | 15 days | 30 days |
| 2 | 0.15 Q$_2$O:SiO$_2$:29 H$_2$O | 15 days | 30 days |
| 3 | 0.15 Q$_2$O:SiO$_2$:15 H$_2$O | 15 days | 30 days |

Q = N-benzyl-1,4-diazabicyclo[2.2.2]octane cation ("benzyl-DABCO")

With all three gel compositions, all-silica-SSZ-42 was formed after 30 days. However, with the gel composition of Example 2 (0.15 R$_2$O: SiO$_2$: 29H$_2$O), some impurity co-crystallized.

With the gel compositions which contain the most and least amount of water (0.15 R$_2$O: SiO$_2$: 43H$_2$O (Example 1) and 0.15 R$_2$O: SiO$_2$: 15H$_2$O (Example 3)), all-silica SSZ-42 already fairly well crystallized after 15 days, but with lower crystallinity as compared to that of the corresponding samples recovered after 30 days.

Example 4

Synthesis of All-Silica SSZ-42 Using Boron-Containing SSZ-42 (B-SSZ-42) as Seeds All silica SSZ-42 was synthesized using 2 wt. % as-made B-SSZ-42 (based on the weight of the SiO$_2$ in the gel composition) as seeds. The synthesis was carried out at 150° C. under static conditions. The gel composition (expressed in mole ratios and excluding the seeds) is shown in the table below:

| Example No. | Gel Composition (Mole ratios expressed as oxides, excluding seeds) | Remarks |
|---|---|---|
| 4 | 0.018 K$_2$O:0.15 Q$_2$O:SiO$_2$: 43 H$_2$O | Source of K$_2$O was KOH |

Q = benzyl-DABCO
With KOH present, all-silica SSZ-42 crystallized after four weeks.

What is claimed is:
1. A method for directly synthesizing an all-silica zeolite having the IFR framework topology in the absence of fluorine, said method comprising:
   (a) preparing a reaction mixture comprising (1) an active source of silicon oxide, (2) a structure directing agent comprising a N-benzyl-1,4-diazabicyclo[2.2.2] octane cation, (3) an active source of hydroxide, and (4) water; and
   (b) maintaining the reaction mixture under conditions sufficient to form crystals of the all silica IFR zeolite.

2. The method of claim 1 wherein the reaction mixture has the following composition:

| | |
|---|---|
| OH$^-$/SiO$_2$ | 0.05 to 0.50 |
| Q/SiO$_2$ | 0.10 to 1.0 |
| M$_{2/n}$/SiO$_2$ | 0 to 0.50 |
| H$_2$O/SiO$_2$ | 3 to 100 |
| Q/Q + M$_{2/n}$ | 0.50 to 0.95 | wherein Q is a N-benzyl-1,4-diazabicyclo[2.2.2] octane cation, M is an alkali metal cation, alkaline earth metal cation or ammonium cation, and n is the valence of M.

3. The method of claim 2 wherein the reaction mixture has the following composition:

| | |
|---|---|
| OH$^-$/SiO$_2$ | 0.15 to 0.30 |
| Q/SiO$_2$ | 0.10 to 0.25 |
| M$_{2/n}$/SiO$_2$ | 0.03 to 0.10 |
| H$_2$O/SiO$_2$ | 20 to 50 |
| Q/Q + M$_{2/n}$ | 0.66 to 0.90. |

* * * * *